United States Patent
Flaherty

(10) Patent No.: US 7,755,021 B2
(45) Date of Patent: Jul. 13, 2010

(54) NON-TOXIC PHOTO CELLS AND PHOTOSENSORS INCLUDING THE SAME

(75) Inventor: Richard Charles Flaherty, Fuquay Varina, NC (US)

(73) Assignee: Tyco Electronics Corporation, Middletown, PA (US)

( * ) Notice: Subject to any disclaimer, the term of this patent is extended or adjusted under 35 U.S.C. 154(b) by 52 days.

(21) Appl. No.: 12/031,910

(22) Filed: Feb. 15, 2008

(65) Prior Publication Data
US 2009/0206760 A1 Aug. 20, 2009

(51) Int. Cl.
*H05B 37/02* (2006.01)

(52) U.S. Cl. .............................. 250/214 AL; 250/239; 250/205; 315/159

(58) Field of Classification Search ........... 250/214 AL, 250/239, 205; 315/159
See application file for complete search history.

(56) References Cited

U.S. PATENT DOCUMENTS

| | | | |
|---|---|---|---|
| 3,421,008 A | 1/1969 | Shaw | |
| 3,483,430 A | 12/1969 | Nuckolls et al. | |
| 4,731,551 A * | 3/1988 | Gibbs et al. | 250/214 AL |
| 4,733,103 A | 3/1988 | Itoh et al. | |
| 4,791,290 A * | 12/1988 | Noone et al. | 250/239 |
| 6,593,564 B2 | 7/2003 | Cheng | |

FOREIGN PATENT DOCUMENTS

| | | |
|---|---|---|
| DE | 1 763 251 A1 | 7/1970 |
| DE | 201 20 204 U1 | 3/2002 |
| GB | 2 203 240 A | 10/1988 |
| GB | 2 361 315 A | 10/2001 |
| JP | 05-055886 | 3/1993 |

OTHER PUBLICATIONS

STD1LNK60Z-1 STQ1NK60ZR-AP-STN1NK60Z, www.st.com, Jul. 2007, 1 page.
Photoconductive Cell, VT400 Series, PerkinElmer Optoelectronics, www.perkinelmer.com/opto, (admitted prior art), 1 page.
International Search Report and Written Opinion (14 pages) corresponding to International Application No. PCT/US2009/000724; Mailing Date: May 27, 2009.

* cited by examiner

*Primary Examiner*—Seung C Sohn
(74) *Attorney, Agent, or Firm*—Myers Bigel Sibley & Sajovec

(57) ABSTRACT

Photo control devices include a housing having a light transmissive portion. A photosensor is positioned in the housing to receive light passing through the light transmissive portion of the housing. A relay electrically coupled to the photosensor is responsive to a level of light detected by the photosensor. The photosensor includes a light sensitive silicon photo cell and an electronic circuit. The electronic circuit is coupled to the silicon photo cell and the relay and includes a field effect transistor (FET) including a zener diode therein between a source and a drain of the FET. The silicon photo cell may be a photodiode and/or a phototransistor. The relay may be a thermal switch including a heater resistor.

25 Claims, 4 Drawing Sheets

NON-TOXIC PHOTO CELLS AND PHOTOSENSORS INCLUDING THE SAME

BACKGROUND OF THE INVENTION

The present invention relates to photo cells and, more particularly, photo cells for use in photosensors for light level switching control.

Photo controllers are devices that automatically turn electrical devices on and off in response to the ambient light level. They are used, for example, on street lights to automatically turn them off during the day and on at night. They are also used on billboard lighting systems to turn the billboard lights on early at night, off late at night during periods of low vehicular traffic, on again during early morning rush hour periods when high traffic levels resume, and then off during the daylight hours. Photo controllers may also be used in reverse, for example, to turn a golf course water fountain on during the day and off at night.

Typical photo controllers use photosensors as a means to detect the ambient light level. Two common types of photosensors include either cadmium sulfide (CdS) photo cells or silicon junction devices (hereinafter "silicon sensors").

Although the spectral response of CdS cells closely approximates the spectral response of a human eye, CdS cells tend to deteriorate rapidly in areas of high humidity, salt spray, or acidic air pollution again causing a drift toward longer burning hours caused by an earlier turn on and later turn off times. CdS cells also raise a potential disposal issue because of perceived cadmium hazards. Nonetheless, because of low initial cost and long history of use and human eye spectral response, CdS photo cells are still commonly used as a light sensor for photo controls.

An example of a conventional CdS photo cell and a photo control circuit using the same are shown in FIGS. 1A and 1B, respectively. As seen in FIG. 1A, the photo cell 100 includes a substrate (circuit board) 110 with a pair of leads 115 extending from a bottom surface 110a thereof. An upper surface 110b of the substrate 110 includes a CdS photosensitive region. As seen in FIG. 1B, the photo control circuit 150 includes a relay 155 having a heater resistor 157 coupled to the AC power neutral/white line through a CdS photo cell 160. The illustrated relay 157 is a normally closed relay.

Silicon sensors are also known. Such silicon sensors are also used in photo controls.

SUMMARY OF THE INVENTION

Embodiments of the present invention provide photo control devices including a housing having a light transmissive portion. A photosensor is positioned in the housing to receive light passing through the light transmissive portion of the housing. A relay electrically coupled to the photosensor is responsive to a level of light detected by the photosensor. The photosensor includes a light sensitive silicon photo cell and an electronic circuit. The electronic circuit is coupled to the silicon photo cell and the relay and includes a field effect transistor (FET) including a zener diode therein between a source and a drain of the FET. The silicon photo cell may be a photodiode and/or a phototransistor. The relay may be a thermal switch including a heater resistor.

In other embodiments, the electronic circuit further includes a rectifier having an output terminal coupled to the drain of the FET. The rectifier may be a half-wave rectifier coupled between an alternating current (AC) voltage source and the FET. A first terminal of the silicon photo cell may be coupled to the output terminal of the rectifier and to a gate of the FET and a second terminal of the silicon photo cell and the source of the FET may be coupled to ground. The electronic circuit may further include a resistor and the output terminal of the rectifier may be coupled to the gate of the FET and the first terminal of the silicon photo cell through the resistor. The electronic circuit in some embodiments includes a resistor and a second zener diode and the output terminal of the rectifier is coupled to the first terminal of the silicon photo cell through the resistor and the second zener diode is coupled in parallel with the silicon photo cell. In some embodiments, the rectifier is a full-wave rectifier.

In further embodiments, the photosensor is a circuit board including the silicon photo cell and the electronic circuit thereon and having a maximum diameter of less than about 10 millimeters (mm). A first and second conductive lead extend from a bottom surface thereof. The photo control device may further include a second circuit board mounted in the housing and the relay may be mounted on the second circuit board and the photosensor may be mounted on a location of the second circuit board configured to interchangeably receive the photosensor or a cadmium sulfide photo cell to enable light level detection by the photo control device.

In other embodiments, the photo control device is a street lighting photo control device. The relay is configured to activate to switch off street lighting responsive to detection of light by the silicon photo cell.

In yet other embodiments, photo control devices include a housing having a light transmissive portion. A photosensor is positioned in the housing to receive light passing through the light transmissive portion of the housing. The photosensor is a circuit board including a silicon photo cell and associated electronic circuit thereon. The photosensor has a maximum diameter of less than about 10 millimeters (mm) and the circuit board has a first and second conductive lead extending from a bottom surface thereof. A relay electrically coupled to the photosensor is responsive to a level of light detected by the photosensor. The silicon photo cell may be a photodiode and/or a phototransistor and the relay may be a thermal switch including a heater resistor. The electronic circuit may include a field effect transistor (FET) including a zener diode therein between a source and a drain of the FET. The electronic circuit may further include a rectifier having an output terminal coupled to the drain of the FET.

In yet other embodiments, photosensors are provided. The photosensors include a light sensitive silicon photo cell and an electronic circuit. The electronic circuit is coupled to the silicon photo cell and includes a field effect transistor (FET) including a zener diode therein between a source and a drain of the FET. The photosensor may be a circuit board including the silicon photo cell and the electronic circuit thereon and having a maximum diameter of less than about 10 millimeters (mm) and having a first and second conductive lead extending from a bottom surface thereof. The electronic circuit may further include a rectifier having an output terminal coupled to the drain of the FET. The electronic circuit may convert an output of the silicon photo cell to a level substantially similar to an output of a cadmium sulfide (CdS) photo cell.

In further embodiments, photosensors include a circuit board having a maximum diameter of less than about 10 millimeters (mm). A silicon photo cell is on the circuit board. An electronic circuit on the circuit board is coupled to the silicon photo cell. A first and second conductive lead coupled to the electronic circuit extend from a bottom surface of the circuit board. The electronic circuit may convert an output of the silicon photo cell to a level substantially similar to an output of a cadmium sulfide (CdS) photo cell.

DETAILED DESCRIPTION OF EMBODIMENTS OF THE INVENTION

Figure 1A:
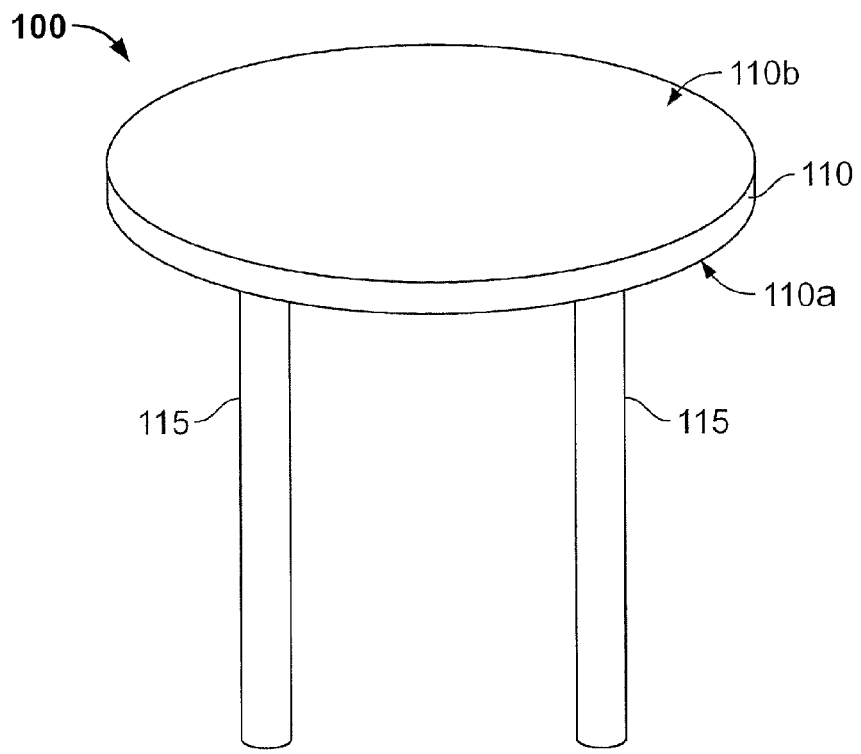
FIG. 1A is a schematic perspective view of a conventional CdS photo cell.
Figure 1B:
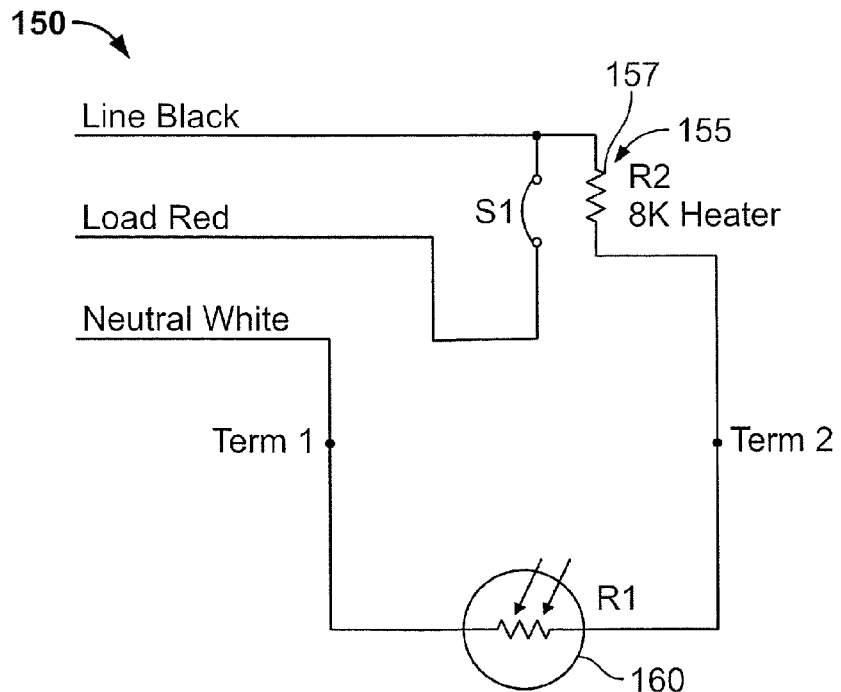
FIG. 1B is a circuit diagram of a conventional photo control circuit including a conventional CdS photo cell.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Figure 2:
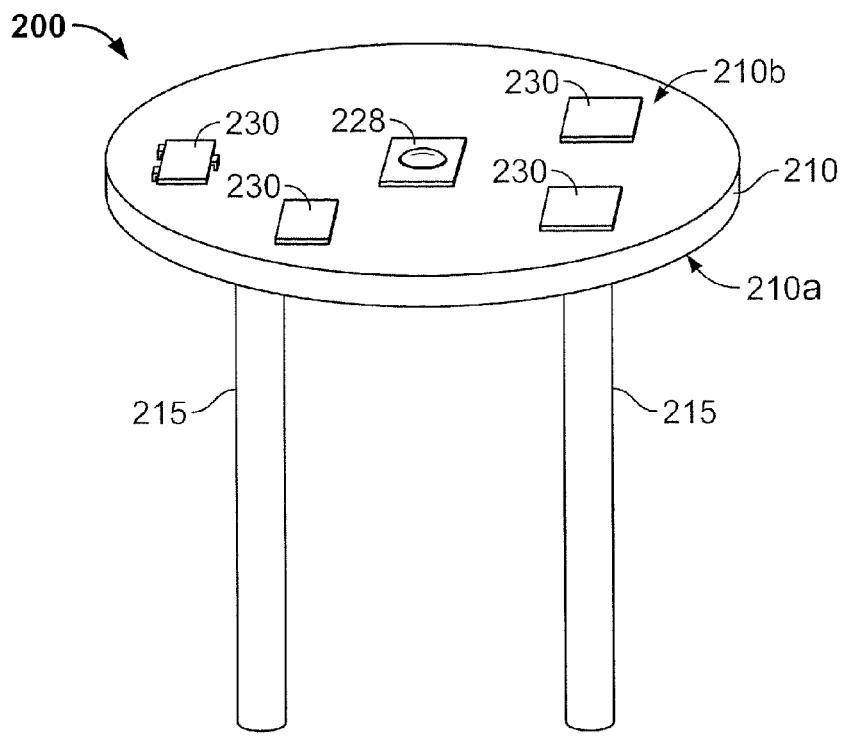
FIG. 2 is schematic perspective view of a silicon photosensor according to some embodiments of the present invention.

A silicon photosensor according to some embodiments of the present invention will now be described with reference to the schematic perspective view illustration of FIG. 2. As seen in the embodiments of FIG. 2, the photosensor 200 includes a substrate (circuit board) 210 having a pair of leads 215 extending from a bottom surface 210a of the substrate 210. A light sensitive silicon photo cell 228 and an electronic circuit 230 coupled to the photo cell 228 are shown on an upper surface 210b of the substrate 210. The electronic circuit 230 is operatively coupled to the leads 215 to allow for insertion of the photosensor 200 into a photo control circuit.

As seen by comparing FIG. 1A and FIG. 2, the photosensor 200 is sized to serve as a drop-in replacement for a cadmium sulfide photo cell 100, currently used in a variety of photo control devices. Such uses may include control of outdoor lighting, such as area or street lighting, light level sensing or other cadmium sulfide light level sensor applications.

The electronic circuit 230 coupled to the silicon photo cell 228 may be configured to facilitate drop-in replacement of a cadmium sulfide photo cell. For example, in some embodiments, the additional electrical components may amplify the signal to levels substantially similar to those of a cadmium sulfide photo cell 100. As is also visually illustrated, similar or even identical mechanical dimensions may be used in both types of photo cells. Such benefits may be provided in various embodiments of the present invention as will be described herein by provision of an electronic circuit 230 with a reduced part count allowing the circuit to fit within the mechanical limitations of the desired size for the substrate 210. For example, in some embodiments, the substrate 210 has a maximum diameter of less than about 10 millimeters.

Replacement of a cadmium photo cell with silicon photosensor 200 according to some embodiments of the present invention may be beneficial as cadmium has been recognized as a toxic substance that may expose workers to health risk from working with the cadmium and, at the end of a life of a product including cadmium, the product must be disposed of as a toxic waste. Furthermore, various government entities, in light of these considerations, have prohibited the use of cadmium. Embodiments of the present invention as described herein may not require the use of any toxic substances. Furthermore, as noted above, by providing a circuit arrangement in a compact enough space to correspond to that conventionally occupied by cadmium sulfide photo cells in existing products, it is possible to use existing product housings and the like with little or no redesign. In contrast, conventional silicon photo cell sensors generally would not be capable of fitting in such existing photo control product housing configurations and could require significant photo control product redesign.

By providing such a substitute photosensor, various other benefits may be provided in photo control devices including photosensors. Typically CdS photo cells have relatively short operating lifetimes when compared to silicon sensor products, such as described herein. For example, while a CdS photo cell typically lasts about three years, a silicon based product, such as described herein, may be expected to have a lifetime of up to and exceeding ten years. CdS photo cells are typically also subject to significantly more drift in light sensitivity. For example, a typical CdS photo cell's light sensitivity over a three year period may drift 100%. In contrast, with silicon based photosensors, such as described herein, drift over a 10 year period may be less than 10%. CdS photo cells are also generally more vulnerable to voltage surges (Such as lightning strikes) than the silicon photosensors of the present invention. The CdS photo cell typically has a maximum voltage rating of 400 $V_p$ and the CdS photo cell will typically fail permanently when the maximum voltage is reached. In contrast, some embodiments of the present invention may provide silicon photo cells having a maximum voltage rating of about 6,000 volts.

In addition, further advantages that may be provided by some embodiments of the present invention using an electronic circuit in combination with a silicon photo cell to replace a cadmium photo cell include allowing more precise light level switching points, faster response and additional timing and logic functions by varying electronic characteristics of the respective components included in the circuit so as to suit a particular application thereof. In addition, components may be selected allowing a combination of a silicon photo cell and electronic circuit associated therewith at a cost that may be substantially similar to that of a conventional CdS photo cell.

Referring again to the embodiments of FIG. 2, the substrate 210 may be a printed circuit board (PCB) and the components of the circuit 230 may be, for example, non-toxic components that may be soldered onto the PCB using, for example, non-lead solder.

Embodiments of circuits for a photo control device including a photosensor according to various embodiments of the present invention will now be further described with reference to the circuit diagrams of FIGS. 3 through 5. Referring first to the embodiments illustrated in FIG. 3, the photo control circuit 300 includes a photosensor 328 and a relay 355 electrically coupled to the photosensor 328 that is responsive to a level of light detected by the photosensor 328. The photosensor 328 couples the relay 355 to the AC neutral/white (ground) terminal. More particularly, as shown in FIG. 3, the relay 355 is a thermally switched relay including a heater resistor 357.

Figure 3:
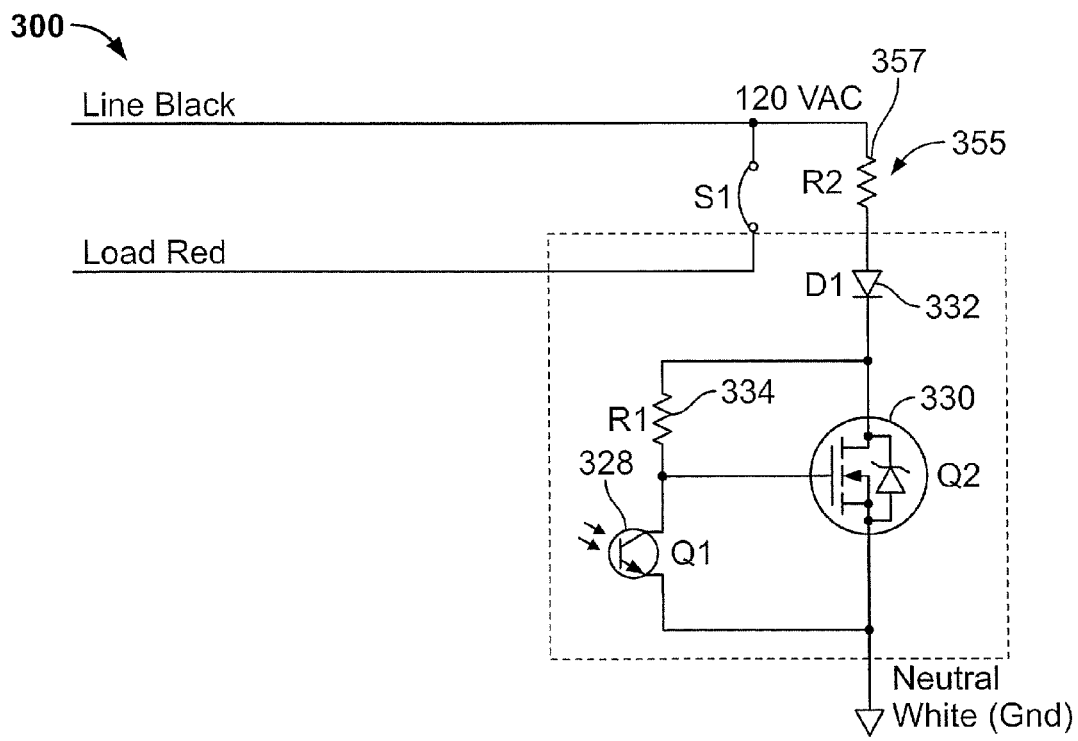
FIG. 3 is a circuit diagram of a photo control circuit for a silicon photo cell according to some embodiments of the present invention.

The photosensor 328 may be a photodiode and/or a phototransistor as illustrated in FIG. 3. The electronic circuit coupled to the photosensor 328 in the embodiments of FIG. 3 includes a half wave rectifier provided by a diode 332. The circuit further includes a resistor 334 and a field effect transistor (FET) 330 that includes a zener diode between a source and drain of the FET 330. The diode 332 is coupled through the relay 355 between an alternating current (AC) voltage source and the FET 330. More particularly, an output terminal of the diode 332 is coupled to the drain terminal of the FET 330. A first terminal of the silicon photo cell 328 is coupled to the output terminal of the diode 332 through the resistor 334 and is also coupled to a gate terminal of the FET 330. The second terminal of the silicon photo cell 328 and the source terminal of the FET 330 are coupled to ground. The heater resistor 357, the rectifier 332 and the FET 330 are shown in series in FIG. 3. However, it will be understood that these components may be arranged in other manners and still operate as an electronic circuit suited for use with a silicon photo cell in a manner substantially similar to the configuration shown in FIG. 3.

The FET 330 may be, for example, a Zener-Protected SuperMESH™ power MOSFET, model STD1LNK60Z-1, available from STMicroelectronics. In addition to the source/drain zener diode, a protective zener diode arrangement may be provided internally between the gate and source terminals of the FET 330.

As the diode 332 is used to provide a half-wave rectifier in the circuit of FIG. 3, in an AC circuit a current will be expected to pass through the circuit only during half of the line voltage cycle. As a result, if the circuit of FIG. 3 is to be used to substitute for a CdS photo cell in an existing product configuration where the relay 355 is already included in the circuit, the heater resistor 357 may need to be halved in resistance to provide a substantially similar response when coupled to a half-wave rectifier. In addition, as the circuit arrangement of FIG. 3 will typically reverse the logic found in a conventional based photo control, a normally open thermal switch may need to substituted for a conventional normally closed thermal switch.

A photo control circuit 400 for a silicon photo cell according to further embodiments of the present invention will now be described with reference to the circuit diagram of FIG. 4. As shown in FIG. 4, a relay 455 is coupled to a light sensitive photosensor 428. An electronic circuit associated with the photosensor 428, which may be, for example, a phototransistor or a photo diode, includes a FET 430. The FET 430 includes a zener diode therein between a source and a drain terminal of the FET 430. The electronic circuit further includes a diode 432 acting as a half-wave rectifier positioned between the thermal relay 455 and the FET 430 and the related circuitry coupled to the photosensor 428. The thermal relay 455 includes a heater resistor 457 and a normally closed switch coupled to the AC voltage source lines.

Figure 4:
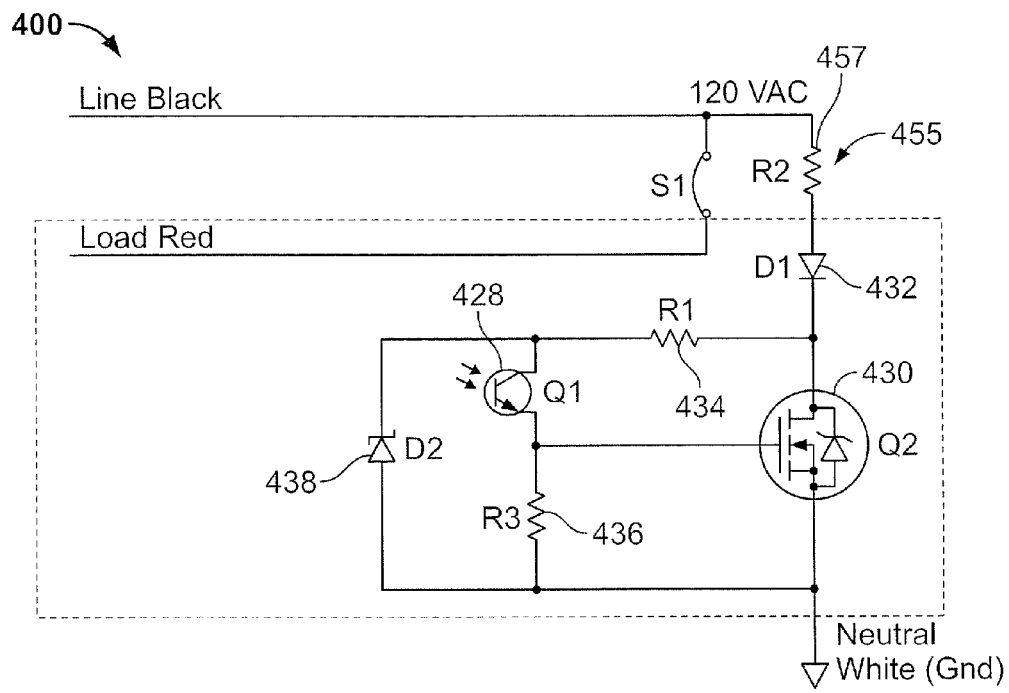
FIG. 4 is a circuit diagram of a photo control circuit for a silicon photo cell according to other embodiments of the present invention.
Figure 5:
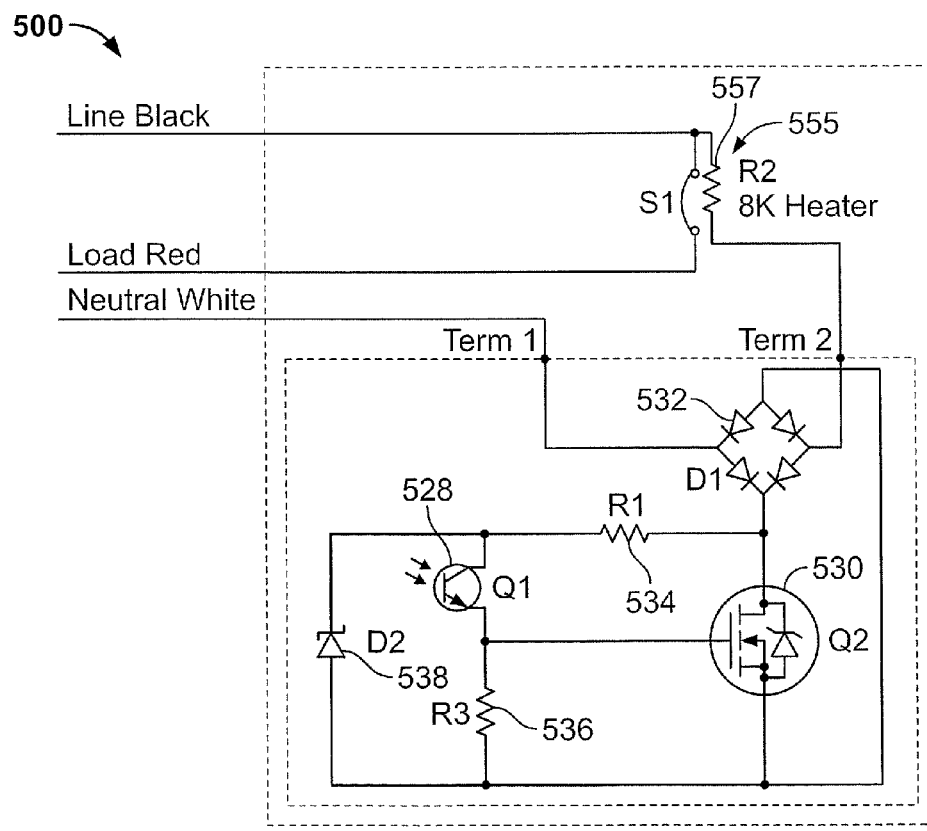
FIG. 5 is a circuit diagram of a photo control circuit for a silicon photo cell according to other embodiments of the present invention.

The circuit of FIG. 4 differs from the circuit of FIG. 3 in that the electronic circuit associated with the photosensor 428, in addition to including the FET 430 and a resistor 434, further includes a resistor 436 and a second zener diode 438. The output terminal of the diode 432 is coupled to a first terminal of the silicon photo cell 428 through the resistor 434 and the second zener diode 438 is coupled in parallel with the silicon photo cell 428 and the resistor 436 connected in series with the photo cell 428 to extend from a gate terminal of the FET 430 and a second terminal of the photo cell 428 to AC ground.

By the addition of the second resistor 436 and the second zener diode 438, the logic of the circuit of FIG. 4 may be reversed from the logic of the circuit of FIG. 3. As discussed above, in various conventional CdS-based photo control configurations, the circuit of FIG. 3 may require reversing the logic of the relay 355. In such cases, use of the circuit of FIG. 4 may allow the logic already in place for the relay 455 to conform with the logic of the electronic circuit associated with the silicon photo cell 428. However, it will be understood that a half-wave rectifier, shown in both FIG. 4 and FIG. 3 (diodes 332, 432), may require halving of the heater resistor 457 as discussed with respect to the heater resistor 357 of the embodiments of FIG. 3.

A photo control circuit 500 according to further embodiments of the present invention will now be described with reference to the circuit diagram of FIG. 5. The circuit diagram of FIG. 5 generally corresponds to the circuit diagram of FIG. 4, where like numbered elements (e.g., 328, 428, 528) perform substantially as described with reference to FIGS. 3 and 4. The photo control circuit 500 of FIG. 5 differs from the photo control circuit 400 of FIG. 4 in that a full wave rectifier 532 is provided in place of the diode 432. As a result, current would be expected to flow through the full-wave rectifier 532 during both halves of the line voltage cycle in an AC circuit. As such, the circuit embodiments of FIG. 5 may be used as a drop-in replacement in some cases without changing either the normally open/normally closed selection of the relay 555 or halving the value of the heater resistor 557 therein.

Referring to FIG. 2, note that the substrate 210 may be referred to herein as a circuit board, such as the PCB 210 shown in FIG. 2. It will be understood that a photo control device including the photosensor 200 may include an additional circuit board mounted in a housing of the device as will be described with reference to FIG. 6. The relay 355, 455, 555 included in the circuit diagrams of FIGS. 3 through 5 may be mounted on this additional circuit board in the housing and the photosensor 200 may, in turn, be mounted on a location of the second circuit board that, in some embodiments, where the photosensor 200 is used as a CdS replacement, may be configured to interchangeably receive the photosensor 200 or a conventional CdS photo cell to enable light level detection by the photo control device. The photo control device may be, for example, a street lighting photo control device and the relay may be configured to activate to switch off street lighting responsive to detection of light by the silicon photo cell 200.

Figure 6:
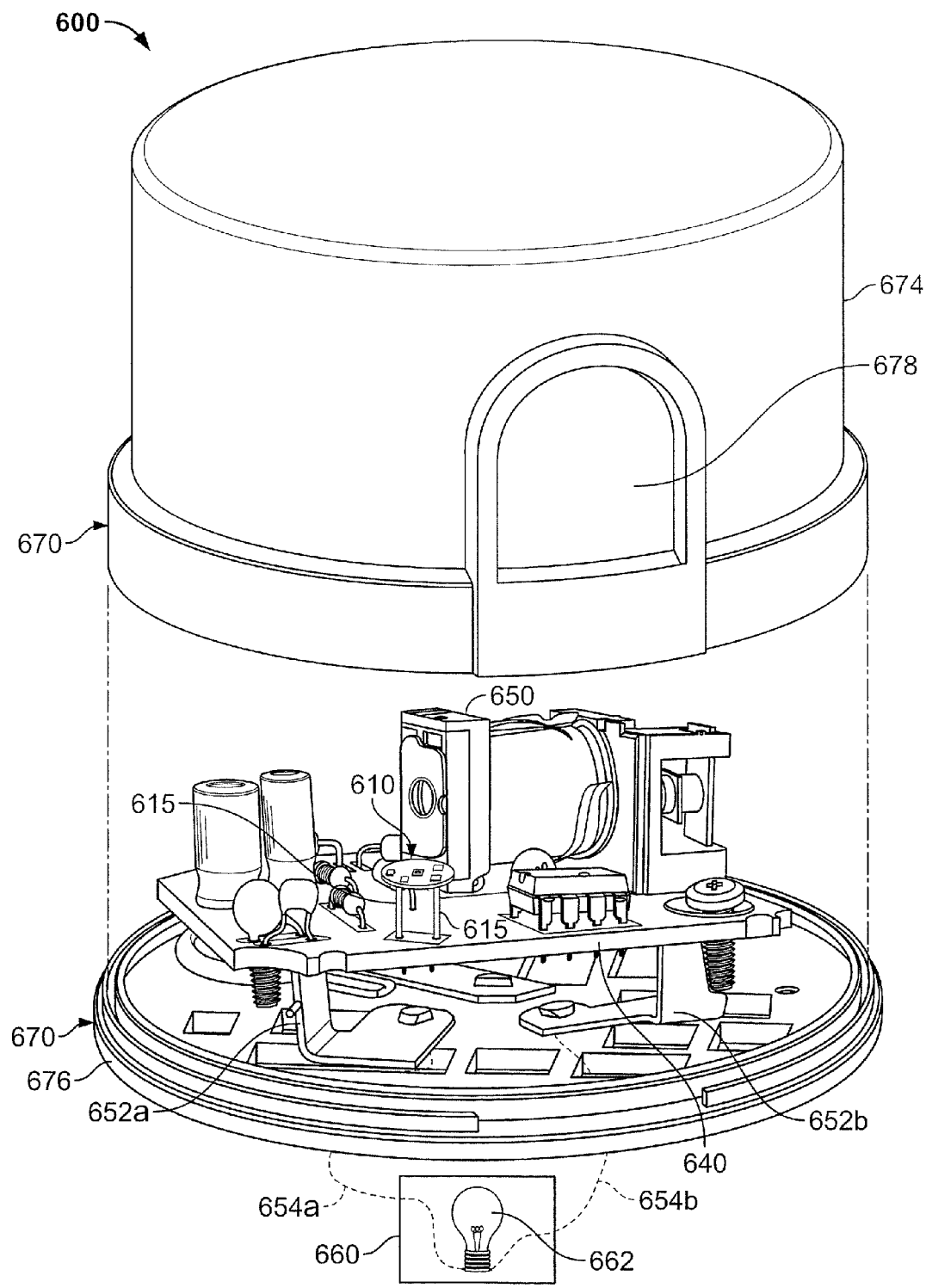
FIG. 6 is a perspective view illustrating a photo control device according to some embodiments of the present invention.

A photo control device 600 according to some embodiments of the present invention will now be described with reference to the exploded perspective view of FIG. 6. An example of a photo control device in which a silicon photo cell as described herein may be used, according to some embodiments of the present invention, is the 6000 Series photo control products available from Tyco Electronics Corporation of Fuquay-Varina, N.C. As shown in the embodiments of FIG. 6, the photo control device 600 includes a photosensor 610, a relay 650 and a circuit board 640 mounted in a housing 670. The photosensor is shown as a silicon photosensor 610 having a pair of leads 615 extending therefrom to mount and electrically connect the photosensor 610 to the circuit board 640. The photosensor 610 may be configured substantially as described with reference to the photosensor 200 of FIG. 2 and may include one of the circuits described with reference to FIGS. 3-5.

The relay 650 is similarly mounted on the circuit board 640 and is electrically coupled to the photosensor 610 so as to be activated responsive to a level of light detected by the photosensor 610. For example, in some embodiments, the photo control device 600 is a street lighting photo control device and the relay 650 is configured to activate to switch off street lighting responsive to detection of light by the photosensor 610. An infrared blocking filter may also be provided to limit sensitivity of the photosensor 610 to infrared electromagnetic radiation.

The illustrated housing 670 includes a base 676 and a cover 674. A light transmissive window 678 is provided in the cover 674. However, it will be understood that, in some embodiments, the entirety of the cover 674 may be made from a light transmissive material rather than only providing a window 678 of light transmissive material. The photosensor 610 is positioned in the housing 670 to receive light passing through the light transmissive window 678.

Also shown in the embodiments of FIG. 6 is an outdoor lighting fixture 660 including a light source 662 therein. The photosensor 610 and relay 650 are illustrated as electrically coupled through leads 652a, 652b inside the housing 670 that provide both mechanical mounting of the circuit board 640 within the housing and an electrical transmission path to external of the housing 670. Also shown schematically in FIG. 6 are electrical connections 654a, 654b from the photo control device 600 to the outdoor lighting fixture 660. In some embodiments of the present invention, known configurations and methods of control of an outdoor lighting fixture 660 using a photo control device may be used for coupling the inventive photo control device 600 to the conventional outdoor lighting fixture 660. As such, for the embodiments illustrated in FIG. 6, activation of the light source 662 may be controlled responsive to a level of light detected by the photosensor 610. Note that, while the lighting fixture 660 has been referred to herein as an outdoor lighting fixture, the present invention is not limited to outdoor applications of the photo control device 600. However, in such outdoor applications, the interface between the cover 674 and base 676 of the housing 670 may be environmentally sealed in some embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent strictures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A photo control device, comprising:
    a housing including a light transmissive portion;
    a photosensor positioned in the housing to receive light passing through the light transmissive portion of the housing; and
    a relay electrically coupled to the photosensor that is responsive to a level of light detected by the photosensor, wherein the photosensor comprises:
    a light sensitive silicon photo cell; and
    an electronic circuit coupled to the silicon photo cell and the relay that includes a field effect transistor (FET) including a zener diode therein between a source and a drain of the FET.

2. The photo control device of claim 1, wherein the silicon photo cell comprises a photodiode and/or a phototransistor.

3. The photo control device of claim 2, wherein the relay comprises a thermal switch including a heater resistor.

4. The photo control device of claim 2, wherein the electronic circuit further includes a rectifier having an output terminal coupled to the drain of the FET.

5. The photo control device of claim 4, wherein the rectifier comprises a half-wave rectifier coupled between an alternating current (AC) voltage source and the FET.

6. The photo control device of claim 5, wherein a first terminal of the silicon photo cell is coupled to the output terminal of the rectifier and to a gate of the FET and a second terminal of the silicon photo cell and the source of the FET are coupled to ground.

7. The photo control device of claim 6, wherein the electronic circuit further includes a resistor and the output terminal of the rectifier is coupled to the gate of the FET and the first terminal of the silicon photo cell through the resistor.

8. The photo control device of claim 6, wherein the electronic circuit further includes a resistor and a second zener diode and the output terminal of the rectifier is coupled to the first terminal of the silicon photo cell through the resistor and the second zener diode is coupled in parallel with the silicon photo cell.

9. The photo control device of claim 4, wherein the rectifier comprises a full-wave rectifier.

10. The photo control device of claim 1, wherein the photosensor comprises a circuit board including the silicon photo cell and the electronic circuit thereon and having a maximum diameter of less than about 10 millimeters (mm) and having a first and second conductive lead extending from a bottom surface thereof.

11. The photo control device of claim 10, wherein the photo control device further includes a second circuit board mounted in the housing and wherein the relay is mounted on the second circuit board and the photosensor is mounted on a location of the second circuit board configured to interchangeably receive the photosensor or a cadmium sulfide photo cell to enable light level detection by the photo control device.

12. The photo control device of claim 1, wherein the photo control device comprises a street lighting photo control device and the relay is configured to activate to switch off street lighting responsive to detection of light by the silicon photo cell.

13. A photo control device, comprising:
a housing including a light transmissive portion;
a photosensor positioned in the housing to receive light passing through the light transmissive portion of the housing, wherein the photosensor comprises a circuit board including a silicon photo cell and associated electronic circuit thereon and having a maximum diameter of less than about 10 millimeters (mm), the circuit board having a first and second conductive lead extending from a bottom surface thereof; and
a relay electrically coupled to the photosensor that is responsive to a level of light detected by the photosensor.

14. The photo control device of claim 13, wherein the silicon photo cell comprises a photodiode and/or a phototransistor and wherein the relay comprises a thermal switch including a heater resistor.

15. The photo control device of claim 14, wherein the electronic circuit includes a field effect transistor (FET) including a zener diode therein between a source and a drain of the FET.

16. The photo control device of claim 15, wherein the electronic circuit further includes a rectifier having an output terminal coupled to the drain of the FET.

17. The photo control device of claim 13, wherein the photo control device comprises a street lighting photo control device and the relay is configured to activate to switch off street lighting responsive to detection of light by the silicon photo cell.

18. A photosensor, comprising:
a light sensitive silicon photo cell; and
an electronic circuit coupled to the silicon photo cell that includes a field effect transistor (FET) including a zener diode therein between a source and a drain of the FET.

19. The photosensor of claim 18, wherein the photosensor comprises a circuit board including the silicon photo cell and the electronic circuit thereon and having a maximum diameter of less than about 10 millimeters (mm) and having a first and second conductive lead extending from a bottom surface thereof.

20. The photosensor of claim 18, wherein the silicon photo cell comprises a photodiode and/or a phototransistor.

21. The photosensor of claim 18, wherein the electronic circuit further includes a rectifier having an output terminal coupled to the drain of the FET.

22. The photosensor of claim 18, wherein the electronic circuit converts an output of the silicon photo cell to a level substantially similar to an output of a cadmium sulfide (CdS) photo cell.

23. A photosensor, comprising:
a circuit board having a maximum diameter of less than about 10 millimeters (mm),
a silicon photo cell on the circuit board;
an electronic circuit on the circuit board coupled to the silicon photo cell; and
a first and second conductive lead coupled to the electronic circuit and extending from a bottom surface of the circuit board.

24. The photosensor of claim 23, wherein the silicon photo cell comprises a photodiode and/or a phototransistor.

25. The photosensor of claim 23, wherein the electronic circuit converts an output of the silicon photo cell to a level substantially similar to an output of a cadmium sulfide (CdS) photo cell.

* * * * *